United States Patent [19]

Hibino et al.

[11] 4,370,865
[45] Feb. 1, 1983

[54] ICE-MAKING AND FRESH WATER DISPENSING APPARATUS

[75] Inventors: Takashi Hibino; Yoshinori Ito, both of Toyoake, Japan

[73] Assignee: Hoshizaki Electric Co., Ltd., Toyoake, Japan

[21] Appl. No.: 297,972

[22] Filed: Aug. 31, 1981

[51] Int. Cl.³ .......................................... F25B 25/00
[52] U.S. Cl. ...................................... 62/124; 62/347
[58] Field of Search ................ 62/123, 124, 347, 348, 62/138

[56] References Cited

U.S. PATENT DOCUMENTS

| | | | |
|---|---|---|---|
| 1,931,347 | 10/1933 | Gay | 62/124 |
| 3,333,436 | 8/1967 | Johnson et al. | 62/123 |
| 3,338,065 | 8/1967 | Ashley | 62/123 |
| 4,262,489 | 4/1981 | Sakamoto | 62/348 X |
| 4,321,802 | 3/1982 | Sakamoto | 62/347 X |

Primary Examiner—William E. Tapoical
Attorney, Agent, or Firm—Wenderoth, Lind & Ponack

[57] ABSTRACT

An apparatus, made in accordance with the present invention, comprises an ice-making unit for making pure ice using a refrigeration system, an electric heater for melting into fresh water the ice produced by the ice-making unit, a tank for storing the fresh water resulting from the melting, a sensor for sensing the water temperature prevailing in the tank, and a control responsive to a signal from the sensor to actuate the heater for maintaining the water temperature at a predetermined value. The apparatus further comprises a sensor for sensing the water level in the tank, and a control responsive to a signal from the water level sensor to control the operation of the ice-making unit for maintaining the water level at a predetermined value.

6 Claims, 12 Drawing Figures

ICE-MAKING AND FRESH WATER DISPENSING APPARATUS

BACKGROUND OF THE INVENTION

This invention relates to an ice-making and fresh water dispensing apparatus having both the function of making ice and the function of making fresh or pure water free of contaminants.

The process of making fresh water by first preparing contaminant-free ice by virtue of the freezing point difference between the pure water and contaminants contained in the starting water to be frozen into ice, and by melting the ice into fresh water, is called the freezing method and is applied to fresh water dispensing apparatusses.

More particularly, such a fresh water dispending apparatus is so designed that at least a part of the ice made by the ice-making section is melted at a heater and the fresh water thus obtained is stored in a storage section. However, warming the water may cause proliferation of bacteria and render the water unfit for drinking.

Moreover, when the supply of water from the ice-making section is in excess of the demand for fresh water, the excess fresh water has to be discarded, which means wasting fresh water.

It is therefore a principal object of the present invention to provide an ice-making and fresh water dispensing apparatus, wherein fresh water is always maintained at a temperature fit for drinking, e.g. in the range of 0° to 10° C., and stored in a moderate volume for more economic consumption of the fresh water.

It is another object of the present invention to provide a novel ice-making and fresh water dispensing apparatus that may be optionally employed as an ice maker, fresh water dispenser, or ice-maker and fresh water dispenser.

SUMMARY OF THE INVENTION

In brief, the apparatus of the present invention consists of an ice-making unit for making pure ice using a refrigeration system, means for heating the ice issued from said ice-making unit to melt same into fresh water, a tank for storing the fresh water obtained from such melting, means for sensing the water temperature prevailing in the tank, and control means for actuating said heating means for maintaining the water temperature at a predetermined value based on signals from said sensing means, and additionally, means for sensing the water level in said tank, and control means for controlling the operation of said ice-making unit based on the signal supplied by said water level sensing means. The apparatus of the present invention thus enables fresh water to be taken out of the tank at a temperature fit for drinking and lends itself to prevention of bacterial infestation or proliferation otherwise caused by excess warming of fresh water. It also minimizing the loss of fresh water due to overflow from the tank.

BRIEF DESCRIPTION OF THE DRAWINGS

The invention will be better understood from the following description taken in conjunction with the accompanying drawings, wherein.

DESCRIPTION OF THE PREFERRED EMBODIMENT

Figure 1:
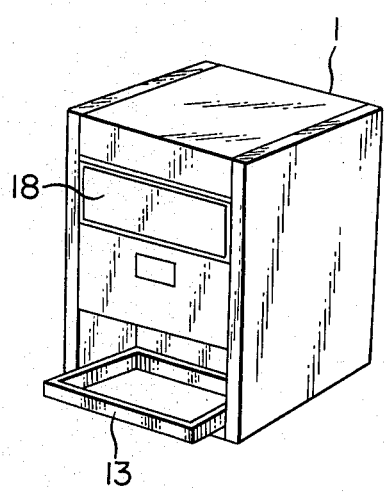
FIG. 1 is a diagrammatic perspective view of an ice-making and fresh water dispensing apparatus according to this invention.
Figure 1A:
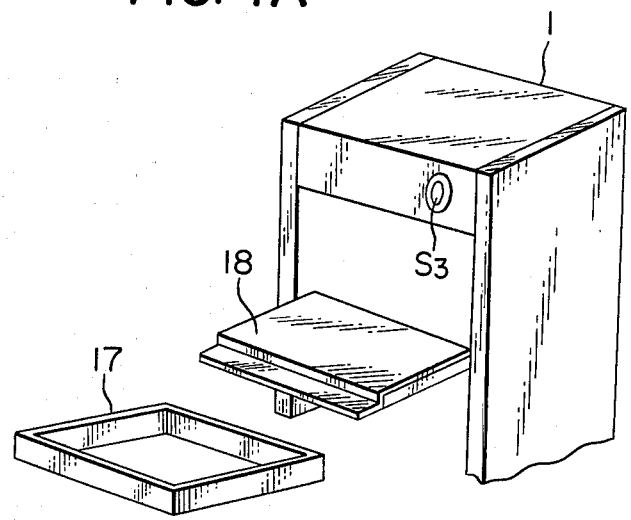
FIG. 1A is a partial perspective view of same, with the ice storage box detached.
Figure 2:
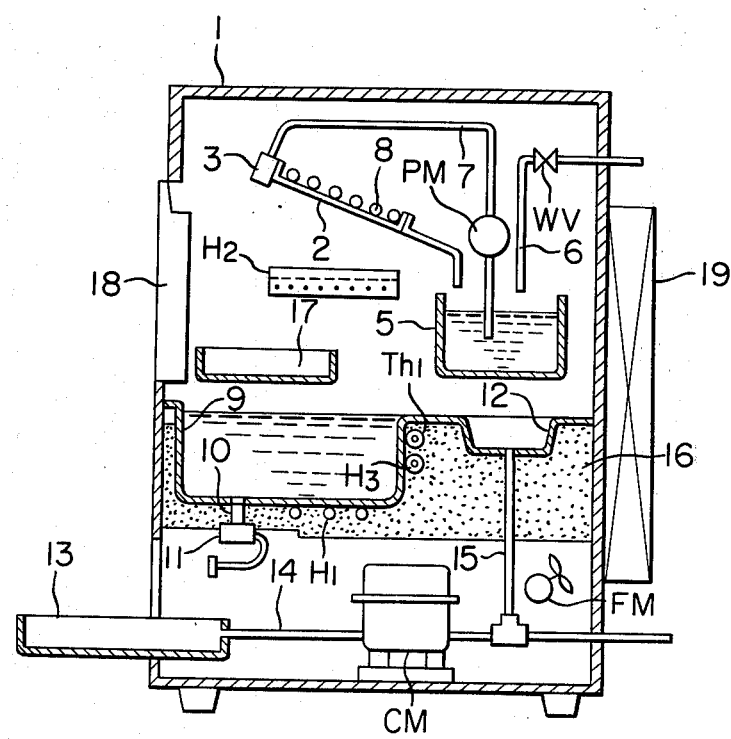
FIG. 2 shows a longitudinal section of same.

In FIGS. 1 and 2, the numeral 1 denotes a main body of a box-shaped ice-making and fresh water dispensing apparatus. A known ice-making mechanism is built in the upper inside region of the box-shaped main body 1. More specifically, the ice-making mechanism 2 includes an obliquely mounted ice-making plate, a water distributor 3 mounted to the upper end of the inclined ice-making plate, a water guide plate 4 mounted to the lower end of the plate 2, a water reservoir 5, and a water supply pipe 6. The reference letters WV and PM denote an electromagnetic valve for water supply and a water circulation pump, respectively. The numeral 7 denotes a conduit or pipe for water circulation and 8 an evaporator constituting the refrigeration cycle. Water is supplied to the water reservoir 5 through said magnetic valve WV controlled by a float type water supply sensing switch to be described later. The water is stored in the reservoir 5 in the predetermined amount and supplied to the distributor 3 by the circulating pump PM to be caused to flow as a thin film on the lower surface of the ice-making plate 2. The water thus flowing on the underside of the plate 2 is cooled by cooling evaporator 8 mounted on the upper surface of the plate 2 and is frozen gradually to form an ice layer on the underside of the plate 2. The ice thus formed on the underside of the ice-making plate is pure ice free from contaminants, owing to the freezing point difference. In addition, since the water is always flowing down the ice-making plate, any dust and dirt or other foreign matter may be washed away, and an ice layer consisting only of pure water may thus be formed and increased in its thickness. The water that has not frozen on the underside of the ice-making plate is returned to water reservoir 5 via guide plate 4 for recirculation in the system.

The ice on the underside of the plate 2 is grown in about 30 to 60 minutes to an ice plate of sufficient thickness. Such growth of the ice plate is sensed as lowered water level in reservoir 5, by a float type ice-making sensor switch $S_1$ to be described later. The signal issued by the switch upon sensing the ice formation operates to deactivate the circulation pump PM and to supply a hot gas to the evaporator 8 from a compressor of the freezing system. The plate 2 is now warmed and the plate-like ice is melted at the contact portion with the plate 2 to drop by gravity onto a heating cutting unit $H_2$ placed below the ice-making plate 2. The unit $H_2$ is designed to cut the plate-like ice into square ice pieces of desired size, and is formed by an upper tier and a lower tier of ice-cutting nichrome wires that are arranged in a chequerboard pattern when viewed from above. When the ice drops, the ice-making plate 2 will experience an abrupt increase in temperature which is sensed by an ice drop or removal sensing thermostat $Th_3$.

An ice-melting tank 9, made of stainless steel or similar material having good heat conductivity and corrosion resistancy, is mounted below said heating cutting unit $H_2$ for receiving the square ice pieces from the heating cutting unit $H_2$.

Figure 7:
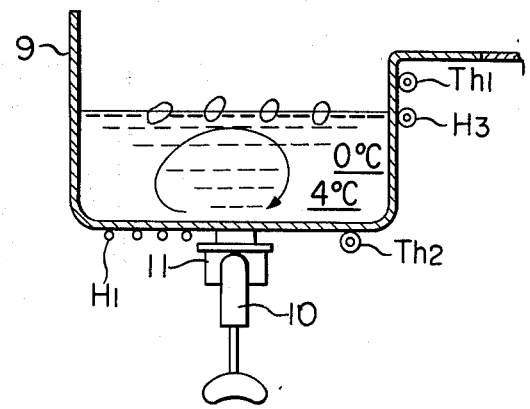
FIG. 7 is a view illustrating the ice-melting tank.

The ice-melting tank 9 is provided at the bottom surface portion with an ice-melting electric heating unit $H_1$ and a thermostat $Th_2$ designed for sensing the water temperature (FIG. 7). The tank 9 is also provided at the bottom surface portion with a discharge pipe 10 for fresh water resulting from the melting and with an operating valve 11.

An overflow reservoir 12 is mounted adjacent to the ice-melting tank 9 for receiving the water overflowing from the tank 9. Below the overflow level, the side wall portion of the tank 9 is provided with a thermostat $Th_1$ for sensing the water level in the tank 9. Further below said overflow level is mounted a preheating unit $H_3$. Below said discharge pipe 10 of said ice-melting tank 9 is mounted an overflow water receiving saucer 13 having a discharge pipe or conduit 14 which is combined with a discharge pipe or conduit 15 from said overflow reservoir 12 and led out of the box-shaped main member 1. In FIG. 2, the numeral 16 is a heat insulating jacket encircling both the ice-melting tank 9 and the overflow reservoir 12.

An ice storage box 17 is mounted in a space defined between said heating cutting unit $H_2$ and said ice-melting tank 9 so as to be able to be taken out of the box-shaped main member 1. In the drawing, the numeral 18 denotes a door mounted at the front side of the main body 1 for access to the stored ice pieces. The storage box 17 is sized and positioned so that when it is in the operative position, it receives a predetermined percentage of ice pieces falling from the heating cutting unit $H_2$.

A compresser CM and a fan FM constituting the refrigeration system are mounted on the bottom of the main body 1, while a condenser 19 is mounted on the back of the main body 1.

Figure 3:
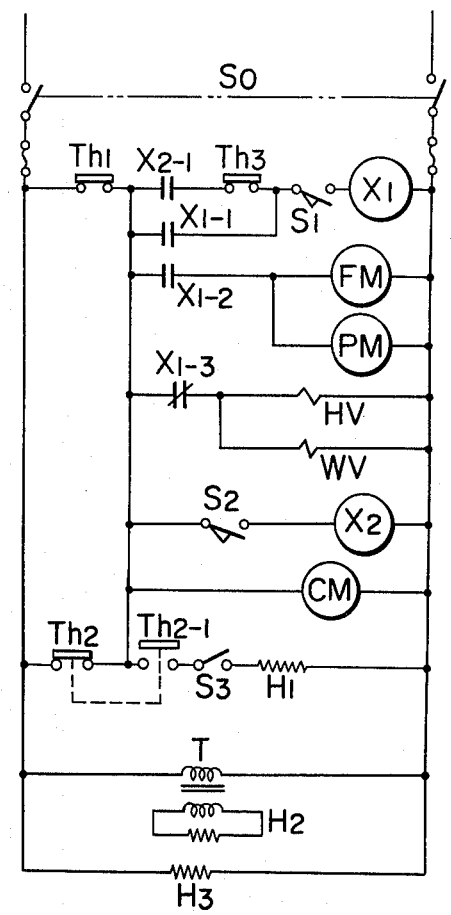
FIG. 3 is a schematic connection diagram of electrical components.

FIG. 3 illustrates a control circuit for the electric system of the above ice-making and fresh water dispensing device. In FIG. 3, $S_o$ denotes the main on/off switches, $S_1$ the float type ice-making sensor switch, mounted to a lower level position in/on the water reservoir 5 of the ice-making mechanism, $S_2$ a float type water supply sensor switch, mounted to a higher level position in/on the water reservoir 5, $X_1$ a relay actuated by the ice-making sensor switch and having normally open contacts $x_{1-1}$, $x_{1-2}$ and normally closed contacts $x_{1-3}$, $X_2$ a relay actuated by the water supply sensor switch having a normally closed switch $x_{2-1}$, HV a hot gas valve of the refrigeration system, T a transformer, $S_3$ a switch of an ice-melting heating unit $H_1$, and $Th_{2-1}$ reverse contacts of the water temperature sensing thermostat $Th_2$.

In the above ice-making and fresh water dispensing apparatus, when the main switches $S_o$ are turned on, the starting water or ice-making water is supplied into water reservoir 5 through solenoid valve WV. When the water level has reached the abovementioned low level, switch $S_1$ is closed. When the water level has reached the abovementioned high level, the float type switch $S_2$ is closed to energize relay $X_2$ to close its normally open contacts $x_{2-1}$. Upon starting the apparatus, the ice removal sensing thermostat $Th_3$ is closed due to higher temperature of the ice-making plate to energize relay $X_1$ to open its normally closed switch $x_{1-3}$. Thus, magnetic valve WV is closed to stop the supply of ice-making water. Simultaneously, the relay $X_1$ acts to close its normally open contacts $x_{1-1}$ to thereby be maintained in the energized state and to close its normally open contacts $x_{1-2}$ to the circulation pump PM and the condenser cooling fan FM into operation and start the ice-making. The water supplied to the distributor 3 by way of circulating pump PM is ejected through not shown distributor holes or slits as a thin film and caused to flow down over the lower surface of the ice-making plate 2. Since the plate 2 is cooled by evaporator 8 (to lower than minus 10° C.), the flowing water is frozen gradually to form an ice layer on the lower surface of the ice-making plate. Due to the difference in freezing points, the ice thus formed on the lower surface of the ice-making plate is pure ice free of any contaminants. Since the water is always flowing down over the plate surface, any dust or dirt or similar foreign matter is washed off, and ice consisting only of pure water continues to grow into the plate-like ice. The water that has not frozen on the ice-making plate surface will flow down the guide plate 4 to be returned to the water reservoir 5 for recirculation.

The plate-like ice on the lower surface of the ice-making plate 2 is grown to a sufficient thickness in 30 to 60 minutes, and such ice growth is sensed by sensor switch $S_1$ as the lowered water level in the water reservoir 5 resulting from said ice growth. Thus, the sensor switch $S_1$ is opened to release the relay $X_1$ to open the normally open contacts $x_{1-2}$. The circulation pump PM is now stopped to discontinue the water circulation. Simultaneously, the normally closed contacts $x_{1-3}$ are closed to open the hot gas valve HV, so that hot gas is supplied from compressor CM to evaporator 8. Due to closure of the normally closed contacts $x_{1-3}$, the magnetic valve WV is opened simultaneously to permit tap water to be supplied into reservoir 5 from the faucet/tap. When the water level in reservoir 5 is elevated by this water supply, the float type water supply sensor switch $S_2$ is turned on to energize relay $X_2$ to turn on the normally open contacts $x_{2-1}$ so as to transmit to relay $X_1$ a signal indicating that the water supply has been completed. Since the hot gas from compresser CM is supplied to evaporator 8, the ice-making plate 2 is warmed. Thus, the ice which has grown into the plate-like ice is melted at the contact portion with the ice-making plate to drop by gravity onto the cutting and heating unit $H_2$ placed below the ice-making plate. Upon dropping of the ice from the ice-making plate, the temperature of the ice-making plate rapidly rises and the ice drop sensing thermostat $Th_3$ is turned on to energize relay $X_1$. The relay $X_1$ operates to close the normally open contacts $x_{1-1}$ to thereby be maintained in the energized state, to open the normally closed contacts $x_{1-3}$ to close the hot gas valve HV and magnetic valve WV, and to close the normally open contacts $x_{1-2}$ to drive the fan FM and the circulation pump PM to start the next ice-making cycle. Upon dropping onto the heating cutting unit $H_2$, the plate-like ice is melt-cut into e.g., twenty to thirty square ice cubes/pieces. These ice cubes/pieces drop by gravity into ice-melting tank 9 in part or in toto, depending on whether the ice storage box 17 is provided or not, and are melted there by heating unit $H_1$ to be stored as fresh water.

The fresh water in tank 9, if it is used to meet only occasional demand, may be warmed, in case the heating unit $H_1$ is turned on at all times, and thus may become unfit for drinking. Moreover, it may be subjected to bacterial infestation.

Hence, the fresh water in the tank 9 should be kept at all times at a temperature in the range of 10° to 0° C. To this end, the water temperature sensing thermostat $Th_2$ is mounted to a predetermined portion of the ice-melting tank 9 for turning off said heating unit $H_1$ when the water temperature is increased beyond a predetermined value so that the water in the tank 9 may be cooled by the latent heat of fusion of the still remaining unmelted ice cubes/pieces. It is not desirable to provide overflow means to permit the water in the ice-melting tank to overflow for discharge when the ice-melting tank has been filled completely with water, in order to maintain the water in the tank at a constant temperature. This is because such a measure leads only to a waste of fresh water. Thus, in the example shown, the water level sensing thermostat $Th_1$ is provided at a predetermined level slightly below the overflow level so that the operation of the ice-making mechanism may be stopped when the water has reached the predetermined level. For assuring its positive operation, the water level sensing thermostat $Th_1$ is so arranged that its water-level sensing temperature sensitive section is warmed by a preheating unit $H_3$ and cooled rapidly by water with a rise in the water level.

The water level sensing thermostat $Th_1$ and the water temperature sensing thermostat $Th_2$ are designed for continuous operation by the circuit in FIG. 3 in the manner shown in the following Table.

| water temperature sensing thermostat $Th_2$ | water level sensing thermostat $Th_1$ | |
|---|---|---|
| | low water level | high water level |
| Water temperature higher than 10° C. | ice-making operation continued; heater $H_1$ off | ice-making operation continued; heater $H_1$ off |
| water temperature lower than 10° C. | ice-making operation continued; heater $H_1$ on | ice-making operation stopped; heater $H_1$ on |

Figure 3A:
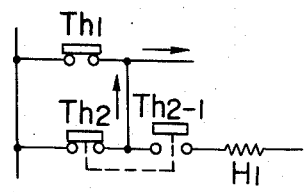
FIGS. 3A to 3D are partial circuit diagrams for illustration of the circuit.
Figure 3B:
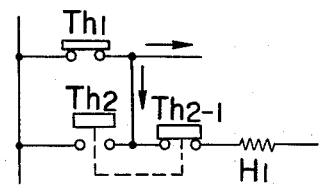
Figure 3C:
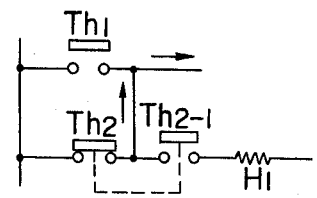
Figure 3D:
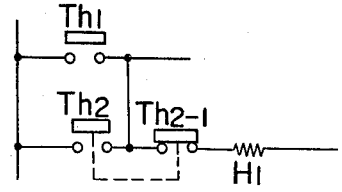

Thus, when the water temperature is higher than 10° C. and the water level low, the circuit in FIG. 3A is completed; when the water temperature is lower than 10° C. and the water level low, the circuit in FIG. 3B is completed; when the water temperature is higher than 10° C. and the water level high, the circuit in FIG. 3C is completed; and when the water temperature is lower than 10° C. and the water level high, the circuit in FIG. 3D is completed. Thus it is only when there is a sufficient water volume in the tank 9 and the water temperature is lower than 10° C. that the ice-making operation is discontinued. Should the water temperature in the tank 9 be higher than 10° C. and the water level sufficiently high, the ice-making operation is continued, so that the water temperature is lowered by the resulting ice blocks, the ice-making operation being terminated only when the water temperature has been lowered to 10° C. or less, and the redundant water being allowed to overflow for discharge from the system.

When the water level in the ice-melting tank is low, the ice-making operation is continued, but the heating unit $H_1$ is turned on and off depending on the water temperature prevailing in the ice-melting tank.

The water level sensing thermostat $Th_1$ is mounted to the outer wall surface of the tank, since dust or dirt or other contaminants may adhere to the thermostat when the latter is mounted to the inner tank surface, and may interfere with the washing of the tank. Moreover, the thermostat of this kind has only low sensitivity and moreover the tank itself is cooled by the cold fresh water in the tank, so that the water level may not be detected accurately. Such a disadvantage may be overcome by having the thermostat $Th_1$ associated with the preheater $H_3$.

Figure 4:
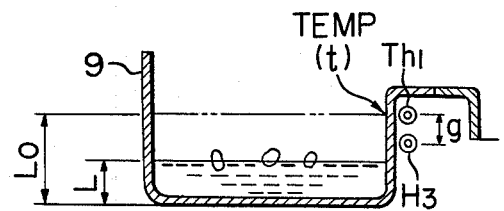
FIG. 4 is a view illustrating the ice melting-tank.
Figure 5:
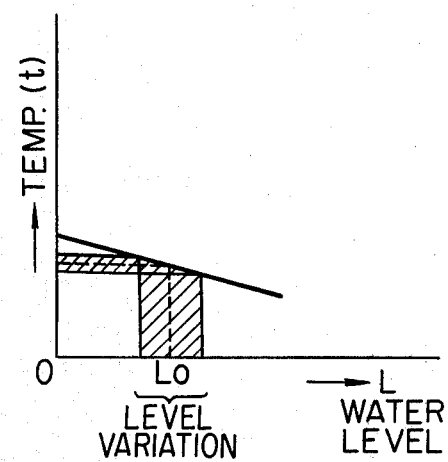
FIGS. 5 and 6 are graphs showing temperature changes, plotted against water level changes, for a certain mounting position of the water level sensing thermostat in the ice-melting tank.
Figure 6:
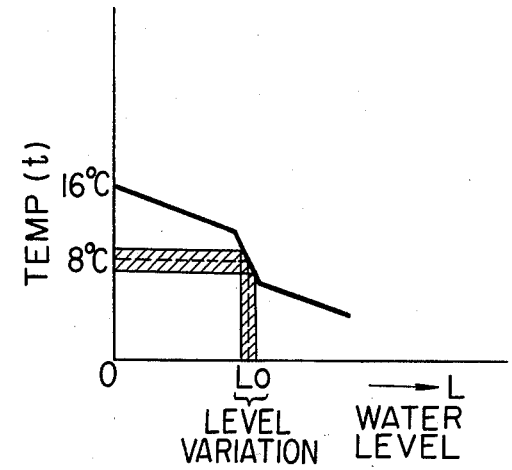

The change of the mounting position of the water level sensing thermostat $Th_1$, related to the change of the water level L in the melting tank 9, is more specifically considered in reference to FIG. 4. In the absence of the preheating unit $H_3$, the range of temperature variation is small for a given range of water level variation, as shown in FIG. 5, and hence the designed water level $L_o$ may involve a larger error, thus making it difficult to sense the water level accurately. If the preheater $H_3$ is mounted about 5 mm below the designed water level of thermostat $Th_1$, the following effect may be obtained. That is, when there is no fresh water at the level of the preheater $H_3$, the tank wall is warmed at that level and, when the water level is gradually elevated and approaches the designed water level $L_o$, the tank wall at said level is rapidly deprived of heat under the influence of the rising water, as shown in FIG. 6, the temperature change for a given change of water level being more acute and enabling more precise sensing of the water level by the water level sensing thermostat $Th_1$.

Referring to the water temperature sensing thermostat $Th_2$ mounted to the melting tank 9, the specific gravity of water is largest at 4° C., and the ice is on the water surface when mixed conjointly with water, so that the tank bottom zone is at about 4° C. even when the water surface zone is at 0° C., regardless of the prevailing water level or the volume ratio of ice blocks to the water. Thus, the water temperature sensing thermostat $Th_2$ may conveniently be mounted to near the tank bottom for operation at 4° C. to 5° C. Moreover, thermostat $Th_2$ may conveniently be mounted to the opposite side of the heater $H_1$ as shown in FIG. 7, since convection will then occur in the tank such that the warmed water first passes by the ice blocks before passing through the zone of thermostat $Th_2$ as shown by the arrow in FIG. 7, and the temperature of the latter zone is raised when the ice blocks have been melted. This assures more precise control of the water temperature.

The apparatus described in the foregoing may be used as an ice maker by turning the switch $S_3$ of the heater $H_1$ off for storing the ice blocks in tank 9, as a fresh water dispenser by turning said switch $S_3$ on, and as a combined ice maker and fresh water dispenser when the storage box 17 extending to substantially below the cutting and heating unit $H_2$ is inserted in the main body for storing part of the ice blocks and melting the remaining part of the ice blocks in the tank.

As described above, the apparatus of the present invention consists essentially of an ice-making unit for making pure ice using a refrigeration cycle system, heating means for heating and melting the ice issued from said ice-making unit, a tank for storing fresh water obtained from such melting, means for sensing the water temperature prevailing in the tank, and control means for actuating said heating means for maintaining the water temperature at a predetermined value based on signals from said sensing means, and additionally, means for sensing the water level in said tank, and control means for controlling the operation of said ice-making unit based on the signal supplied by said water level sensing means. The apparatus of the present invention thus enables fresh water to be taken out of the tank at a temperature fit for drinking and lends itself to prevention of bacterial infestation or proliferation otherwise caused by excess warming of fresh water. It also minimizing the loss of fresh water due to overflow from the tank. Although present invention has been described above with reference to a fresh water dispenser of the type in which heating means is provided for/on the outer bottom surface of the fresh water storage tank, it may also be applied to the type of fresh water dispenser disclosed in U.S. Pat. No. 4,262,489 assigned to the same assignee as the present application. In said U.S. Patent, an ice storage chamber is provided separately from the fresh water storage tank and provided with heating means designed for melting at least part of ice and storing the resulting fresh water in said tank.

Although a single preferred embodiment has been described above, it will be readily understood by those skilled in the art that various rearrangements of parts and modifications of parts may be accomplished without departing from the spirit and scope of the invention as defined in the appended claims.

What we claim is:

1. An ice-making and fresh water dispensing apparatus, comprising in combination: an ice-making unit for making pure ice using a refrigeration system; means for heating the ice issued from said ice-making unit to melt the same into fresh water; a tank for storing the fresh water produced by said melting means; means for sensing the temperature of the fresh water in said tank; means for sensing the water level in said tank; and means for controlling the operations of said heating means and said ice-making unit, said controlling means being operative to terminate heating by said heating means and to continue the operation of said ice-making unit, irrespective of the water level prevailing in the tank, when said water temperature sensing means has determined the water temperature in said tank to be higher than a predetermined temperature, to continue both the heating by said heating means and the operation of said ice-making unit when said water temperature sensing means has determined said water temperature to be lower than said predetermined temperature and the water level in said tank is lower than the predetermined water level, and to discontinue the heating by said heating means and continue the operation of said ice-making unit when said water temperature sensing means has determined said water temperature to be lower than said predetermined temperature and said water level is higher than the predetermined water level.

2. The ice-making and fresh water dispensing apparatus as claimed in claim 1, wherein said heating means, said water temperature sensing means and said water level sensing means comprise respectively an electric heater and thermostats, said electric heater being mounted to one outer bottom surface portion of said tank, said water temperature sensing thermostat being mounted to another outer bottom surface portion of said tank remote from said one portion, and said water level sensing thermostat being mounted to the outer lateral surface at an overflow region of said tank.

3. The ice-making and fresh water dispensing apparatus as claimed in claim 2, wherein said water level sensing means includes, in addition to said thermostat, an electric preheater mounted a short distance from the mounting position of said thermostat.

4. The ice-making and fresh water dispensing apparatus as claimed in claim 1, wherein said control means includes a manually operable switch electrically connected to said heating means to selectively bring said heating means out of operation, and said ice-making unit includes an inclined ice-making plate for forming an ice plate on the under side thereof, and means for heat cutting the ice plate into a number of ice cubes so that the ice cubes are stored in said tank when said switch is turned off to bring said heating means out of operation.

5. The ice-making and fresh water dispensing apparatus as claimed in claim 1, wherein an ice storage box is disposed between said ice-making unit and said tank to receive therein at least part of the ice cubes produced by said ice-making unit.

6. The ice-making and fresh water dispensing apparatus as claimed in claim 5, wherein said ice storage box is removable from said apparatus and sized so that when said ice storage box is disposed in position within said apparatus, the ice cubes falling down from said ice-making unit are received partly in said ice storage box and partly in said tank.

* * * * *